No. 851,449. PATENTED APR. 23, 1907.
S. W. SMITH & A. HOLLINGER.
MACHINE GEAR.
APPLICATION FILED JUNE 25, 1906.
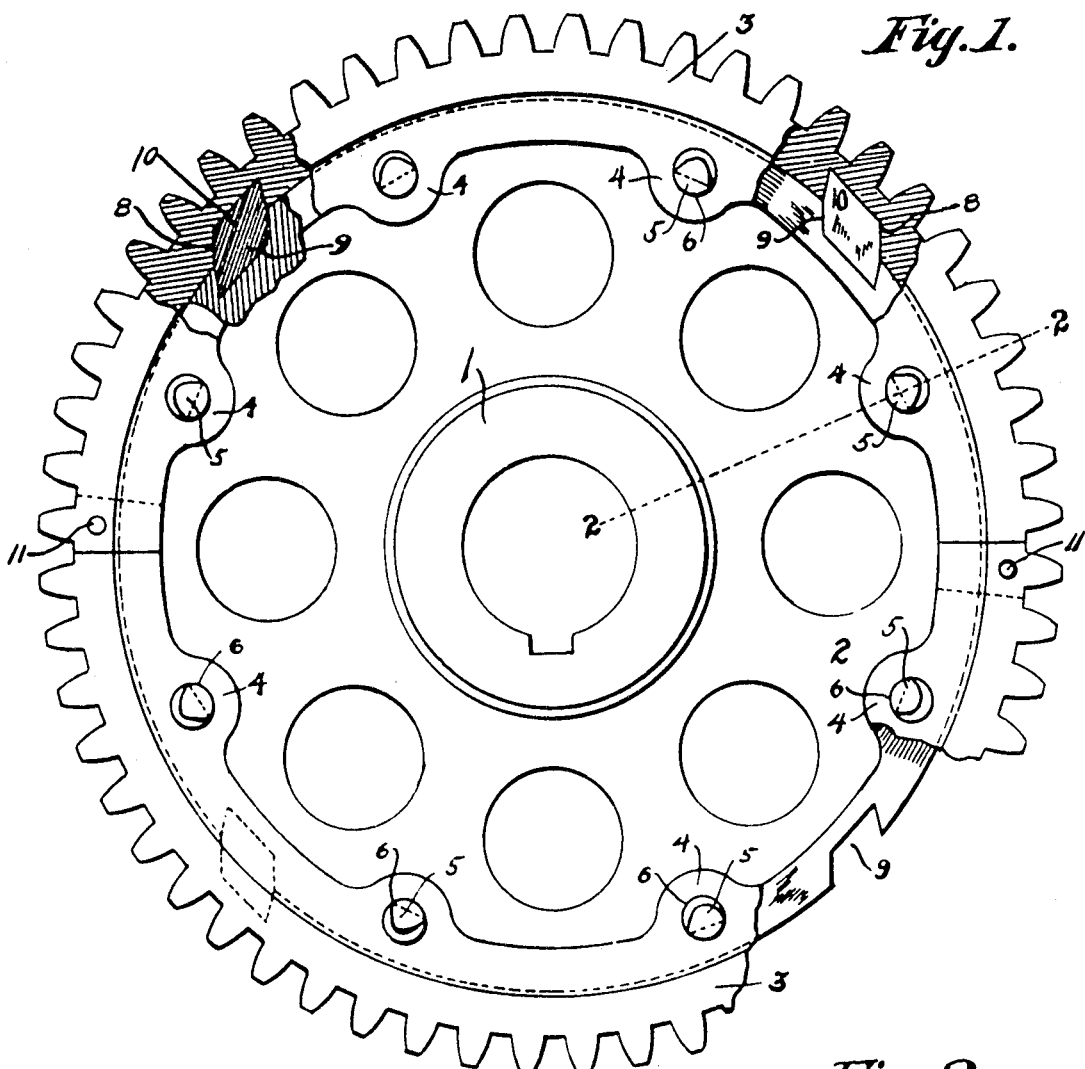
Fig. 1.
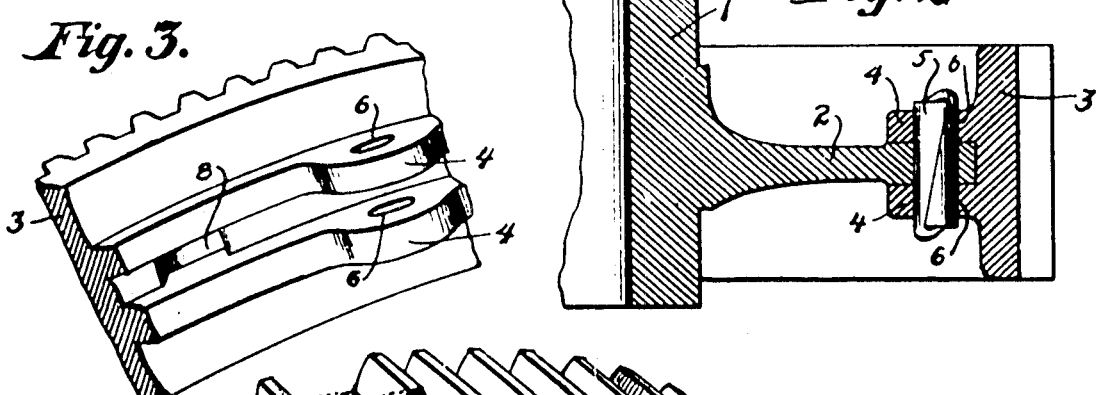
Fig. 2.
Fig. 3.
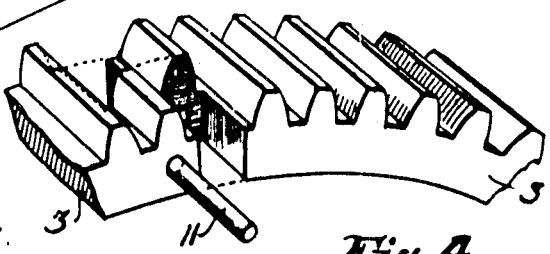
Fig. 4.
Witnesses
Jos. J. Hosler
Sylvia Boson
Inventors
Samuel W. Smith
Andrew Hollinger
By
F. W. Bond
Attorney

UNITED STATES PATENT OFFICE.

SAMUEL W. SMITH AND ANDREW HOLLINGER, OF CANTON, OHIO.

MACHINE-GEAR.

No. 851,449.   Specification of Letters Patent.   Patented April 23, 1907.

Application filed June 25, 1906. Serial No. 323,294.

*To all whom it may concern:*

Be it known that we, SAMUEL W. SMITH and ANDREW HOLLINGER, citizens of the United States, residing at Canton, in the county of Stark and State of Ohio, have invented certain new and useful Improvements in Machine-Gear; and we do hereby declare that the following is a full, clear, and exact description of the same, reference being had to the accompanying drawings, making a part of this specification, and to the numerals and figures of reference marked thereon, in which—

Figure 1 is a side elevation showing the different parts of the gear properly assembled, and showing parts broken away and parts in section. Fig. 2 is a transverse section on line 2—2, Fig. 1. Fig. 3 is a view showing a portion of the segmental toothed rim. Fig. 4 is a view showing the segmental toothed rims detached and their joined ends.

The present invention has relation to machine gear and it consists in the different parts and combination of parts hereinafter described and particularly pointed out in the claims.

Similar numerals of reference indicate corresponding parts in all the figures of the drawing.

In the accompanying drawing 1 represents the hub, which is provided with the integral or attached web 2, which of course may be of any desired diameter reference being had to the size of the gear designed to be constructed. Upon the web 2 are located and attached the segmental toothed rims 3, which when attached are concentric with the hub 1 and the web 2.

For the purpose of providing means for attaching the segmental toothed rims 3 they are provided with a series of flanges 4, which flanges are spaced equal to the thickness of the web 2 at the place where the flanges 4 are brought into contact with said web, this feature being best illustrated in Fig. 2. The rims 2 are securely connected by means of the split bolts 5, which split bolts are tapered and the smaller ends of each section bent so as to securely hold the bolt in proper position, and at the same time securely connect the segmental rims to the web 2.

It will be understood that by tapering the sections of the bolts 5 and forming said sections of a suitable size in cross-section with reference to the aperture 6 in the flanges 4, said bolt sections can be driven endwise thereby providing a wedge action which takes up the slack as between the rim sections of the web 2 and the flanges. In a gear of this kind it is important that there be no relative movement as between the detachable rims and the web and in order to assist in holding the toothed rim sections they are provided with the recesses 8 and the web provided with the notches 9, which recesses and notches are located at an angle to a radial line, by which arrangement the keys or what might be termed dowel blocks 10 can be inserted either in the recesses 8 or the notches 9 and the toothed rims brought toward each other and in contact with the periphery of the web 2, and the dowel blocks properly entered as illustrated in Fig. 1.

For the purpose of insuring a proper joint or connection as between the segmental toothed rim the sections are cut out at their ends upon opposite sides so as to produce a lap and the lapped portions jointed together by means of the pin 11 or its equivalent. We have illustrated the gear as a toothed gear, but it will be understood that we do not desire to be confined to a toothed gear as our invention can be applied equally as well to a smooth faced gear or what might be termed a belt gear or friction gear, and of course sprocket gear. It will be understood that by providing the dowel blocks 10 that the strain as between the web 2 and the rim sections will be distributed as between said blocks and the bolts 5. By locating the dowel blocks 10 at an angle to a radial line, the pressure or line of force will be at an angle to the radial line regardless of the direction of rotation, owing to the fact that the dowel blocks upon opposite sides of a given radial line are set at opposite angles. The dowel blocks 10 are tapered in opposite directions as best illustrated in Fig. 1, so that when they are properly seated they will come in close contact with the recesses 8 and the notches 9, or in other words they will be bound in their positions, when the rim members are brought into their proper positions, and concentric with the web or center of the gear.

For the purpose of holding the divided bolt members after they have been properly inserted their narrow extended ends are bent over and upon the larger ends of said divided bolt members, thereby preventing any relative movement as between the bolt members.

Having fully described our invention what we claim as new and desire to secure by Letters Patent, is—

1. In a machine gear, the combination of a web, segmental sections located upon said web, means for connecting the ends of the segmental sections together and dowel blocks located in notches in the periphery of the web and in the inner wall of the segmental sections, said dowel blocks tapered in opposite directions and located at an angle to a radial line, substantially as and for the purpose specified.

2. In a machine gear, the combination of a hub and a web, a divided rim, the ends of said divided rim being lapped, and said lapped ends being secured together, the rim and web provided with notches, dowel blocks located in the notches, said blocks tapered in opposite directions, and means for securing the divided rim to the web, substantially as and for the purpose specified.

3. In a machine gear, the combination of a center web, a divided rim provided with attaching flanges, there being apertures formed in the flanges, and apertures formed in the center web, bolts divided longitudinally and tapered, said bolts adapted to be inserted in the apertures of the rim-flanges and web and said divided bolt sections secured in position, and dowel blocks located in notches in the periphery of the web and in the inner wall of the divided rim, said notches and dowel blocks located at an angle to a radial line, substantially as and for the purpose specified.

In testimony that we claim the above, we have hereunto subscribed our name in the presence of two witnesses.

SAMUEL W. SMITH.
ANDREW HOLLINGER.

Witnesses:
J. A. JEFFERS,
F. W. BOND.